United States Patent [19]

Smith

[11] Patent Number: 4,724,278
[45] Date of Patent: Feb. 9, 1988

[54] PEDESTAL ENCLOSURE WITH CONTAMINANT BARRIER

[75] Inventor: Arnold R. Smith, Chester, N.J.

[73] Assignee: American Telephone and Telegraph Company AT&T Bell Laboratories, Murray Hill, N.J.

[21] Appl. No.: 807,104

[22] Filed: Dec. 9, 1985

Related U.S. Application Data

[63] Continuation-in-part of Ser. No. 693,608, Jan. 22, 1985, abandoned.

[51] Int. Cl.[4] .................. H02G 9/02; H02G 3/22; F16J 15/10; F16J 15/12
[52] U.S. Cl. .................. 174/38; 174/16 R; 174/65 G; 174/77 R; 174/100; 277/9; 277/12; 277/167.5; 277/198; 277/199; 277/DIG. 10
[58] Field of Search .................. 174/16 R, 37, 38, 60, 174/65 G, 65 SS, 77 R, 92, 99 R, 100, 152 G, 153 G, 155, 156, 157; 248/67.5, 68.1; 277/9, 11, 12, 167.5, 192, 198, 199, DIG. 6, DIG. 10

[56] References Cited

U.S. PATENT DOCUMENTS

| 2,459,370 | 1/1949 | Ferguson et al. | 277/199 X |
|---|---|---|---|
| 2,932,870 | 4/1960 | Williams | 248/67.5 X |
| 3,278,674 | 10/1966 | Matthysse et al. | 174/92 X |
| 3,523,156 | 8/1970 | Phillips, Jr. | 174/65 G X |
| 3,545,773 | 12/1970 | Smith | 174/77 X |
| 3,758,916 | 9/1973 | Wetmore | 174/152 R X |
| 3,830,954 | 8/1974 | Caudill | 248/68.1 X |
| 3,848,074 | 11/1974 | Channell | 174/38 |
| 3,864,510 | 2/1975 | Ramsey, Jr. et al. | 174/38 |
| 3,872,234 | 3/1975 | Smith | 174/38 |

FOREIGN PATENT DOCUMENTS

| 566752 | 12/1958 | Canada. | |
| 1406147 | 6/1965 | France | 248/68.1 |
| 201078 | 6/1983 | German Democratic Rep. | 174/65 G |
| 457574 | 8/1968 | Switzerland | 174/99 R |
| 1043775 | 9/1983 | U.S.S.R. | 174/65 SS |

OTHER PUBLICATIONS

Stillwagon, R. W., "Multiflex Cable Exit Air Seal and Insulation", *IBM Technical Disclosure Bulletin*, vol. 16, No. 7, Dec. 1973, p. 2227.

Primary Examiner—Laramie E. Askin
Attorney, Agent, or Firm—Jack S. Cubert; Robert O. Nimtz; Patrick E. Roberts

[57] ABSTRACT

A compliant, synthetic material of predetermined thickness is inserted into the space between cables and the inner surface of a pedestal enclosure which houses the cables. The compliant material prevents moisture, rodents, and insects from entering the upper portion of the enclosure. Drainage slots are provided. A wire mesh pad or steel wool may be used instead of the compliant, synthetic material. A plurality of embodiments are disclosed.

8 Claims, 19 Drawing Figures

PEDESTAL ENCLOSURE WITH CONTAMINANT BARRIER

This application is a continuation-in-part of application Ser. No. 693,608, filed Jan. 22, 1985, now abandoned.

TECHNICAL FIELD

This invention relates to enclosures for housing electrical and electronic apparatus and/or electrical connections and, more particularly, this invention relates to arrangements for sealing the spaces between the wires or cables and the enclosures.

BACKGROUND OF THE INVENTION

In the installation of wire and cable facilities, both aerial and buried, such as used to provide communications, it is essential to provide access to the wire or cable at certain preselected locations. Such access is required for providing interconnection usually by splices or terminal connections within pedestal enclosures which are subject to weather conditions of varying temperature and humidity as well as precipitation.

In the design of such pedestal enclosures a number of considerations are involved. Basically, the enclosures should be capable of withstanding all weather conditions. They should also prevent insects or small animals from getting inside. Means must be provided to minimize the entry of ground moisture into the functional region of the pedestal. Also, adequate drainage should be provided to prevent accumulation of any water from condensation or water which enters from flooding. Another consideration is flexibility of design for accommodating a wide range of wire and cable sizes.

In the case of pedestal enclosures, gravel is traditionally placed in the base of the pedestal. The gravel is a good moisture barrier and provides excellent drainage. Aside from the inconvenience of the weight and bulk of the material, gravel is not available locally in all geographic areas. In addition, if the gravel is not used or if improper substitutes for gravel are used, ground moisture will enter the enclosure.

It is highly desirable to provide an enclosure which eliminates the need for gravel as a moisture barrier.

SUMMARY OF THE INVENTION

In accordance with the illustrative embodiment of the present invention, there is disclosed a compliant, synthetic material of predetermined thickness which surrounds one or more cables and fills the space between the cables and the inner surfaces of a pedestal enclosure which houses the cables. The synthetic material prevents the ingress of moisture into the upper portion of the pedestal enclosure.

An optional hard plate, which is either synthetic or metallic, may be provided to support the compliant synthetic material and acts to keep rodents and insects from entering the upper portion of the pedestal enclosure.

In those pedestal enclosures which have spaces through which moisture could enter above the synthetic material, small sections of material are removed from the synthetic material along opposite sides adjacent to the inner surface of the pedestal enclosures to permit water to drain off. Small gaps between the compliant material and the inner surface of the pedestal enclosure and between the compliant material and the cables along with the drainage spaces may be allowed up to a predetermined percentage of the free sectional area of the pedestal enclosure without affecting the moisture inhibiting function of the compliant material. In some pedestals, instead of removing material from the synthetic material, a plurality of holes are perforated through the pedestal above and below the synthetic material to permit drainage of water.

The compliant material is cut or slit into two or more sections so that each section may be inserted conveniently between the inner surface of a pedestal enclosure and a cable. The adjacent surfaces of two sections of the compliant material where they meet a cable are cut along closely spaced intervals to form a plurality of fins or webs having a distinct envelope where the webs are attached to the rest of the material. In one embodiment, the envelope is circular. The diameter of the envelope should be larger than the diameter of the cable to be clasped. On either side of the circular cluster of webs, one or more cuts or slits longer than the radius of the circular cluster of webs are made through the entire thickness of the material. The cuts could also have a length equal to or less than the aforesaid radius. The cluster of webs and the long cut together permit the compliant material to yield when inserted into the space between a cable and the inner surface of a pedestal enclosure and to completely seal off any space therebetween.

Slitting the aforesaid compliant material provides two important functions. First, when a cable is clamped between the two sections, only those webs which clamp the cable will experience a compressive force, conforming to the shape of the cable. The remaining region of the compliant material will be undisturbed and will seal the interface between the two sections. Second, the two cuts on both sides of the cluster of webs isolate the clamping region from the remaining region of the compliant material. This ensures that the two sections will meet to seal the interface.

In order to provide for the introduction of a cable into the pedestal at some future time, the aforesaid pattern of cuts is made by perforating the entire thickness of the compliant material and not separating the material into sections but leaving the sections attached at a few spots which may be severed easily.

In another embodiment, the envelope of the fins or webs forms a rectangle. A plurality of clusters are formed. In the space between any two clusters at the surface nearest the base of the pedestal a pentahedral solid of the compliant material is removed leaving a space of the same shape which is used to permit the section to be inserted easily into place between a cable and the pedestal and to reduce the amount of compliant material which clamps a large sized cable, thereby reducing the clamping force. Different sized spaces may be used.

In another embodiment of the present invention, a barrel of compliant material, which may be concave, cylindrical, or convex, having a plurality of thin removable layers has a wedge of material removed from its circumference to its central axis to permit the removal of a desired number of central layers and for insertion around a cable. The barrel of material is then fastened by a suitable belt or tie to form a collar around the cable. A piece of compliant material having a plurality of sections has material removed at the junction of any two of the sections so that the removed material leaves one or more circular spaces. These sections are then inserted into place so that the circular spaces fit around the aforesaid collar. In order to permit the compliant material to fit easily, one or more cuts or slits are made on both sides of each circular space. These cuts isolate the clamping region from the remaining region of the compliant material, ensuring that the two sections will meet to seal the interface.

In order to provide for growth, one or more clusters of circular perforations are made through the compliant material for removal and the introduction of a cable at some future time.

Similar protective material between one or more cables comprising drop wires and a service channel in the aforesaid pedestal enclosures are used. The principles of operation are the same as for those embodiments recited hereinabove. In one embodiment, a piece of compliant material having a plurality of perforations therethrough between the upper and lower ends and having its central perforated portion protrude from its upper and lower ends so as to receive a drop cable into one of the perforations is fit snugly into the service channel and acts to prevent moisture, rodents and insects from entering the upper portion of the pedestal.

In another embodiment, the compliant material may be cut into two sections. One section is fastened to the service channel and the other section is fastened to the cover of the service channel, so that when the cover is placed over the service channel, the two sections fit tightly against each other. The sections of compliant material which face each other are cut into a plurality of closely spaced fins or webs for receiving drop cables therebetween.

In yet another embodiment, a single block of compliant material may be used. A plurality of pieces of material are removed to leave a plurality of holes into which the drop cables are introduced. For ease in working, the block of material may be cut in two.

Instead of the compliant material, a steel wool or wire mesh pad of about the same thickness as the compliant material is lodged between one or more cables and the interior of the cable pedestal. This thickness is sufficient to provide a diffusion barrier against the intrusion of ground moisture into the interior of the pedestal. There is sufficient porosity, however, that water within the upper section of the pedestal will drain through the steel wool. In another embodiment, a thin layer of steel wool is used in combination with the compliant material. An advantage of using steel wool is its resistance to chewing by rodents.

DETAILED DESCRIPTION

Figure 1:
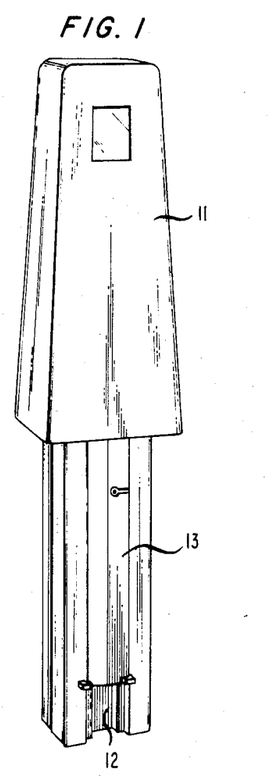
FIG. 1 is a perspective view of one type of enclosure used in outdoor telephone plant.
Figure 2:
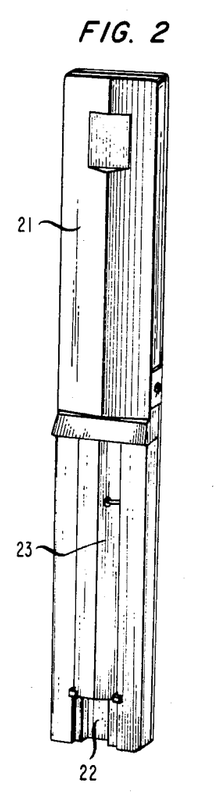
FIG. 2 is a perspective view of another type of enclosure used in outdoor telephone plant.

FIGS. 1 and 2 illustrate alternative versions of a typical enclosure used in the outdoor telephone plant. The enclosure of FIG. 1 features a bell jar type cover 11 which serves to trap air and prevent water from rising within cover 11 to the height where the electrical connections or apparatus are mounted. At the base of this enclosure a service channel 12 is accessed by removing cover 13. The enclosure of FIG. 2 includes a conventional cover 21 with the same base configuration at the enclosure of FIG. 1 which includes a service channel 22 and a cover 23. In addition to the drop wire to the customer which extends from the enclosure through the service channel, the base of each enclosure includes at least one passage for the main cable to extend up inside the portion of the enclosure associated with the drop wire.

Figure 3:
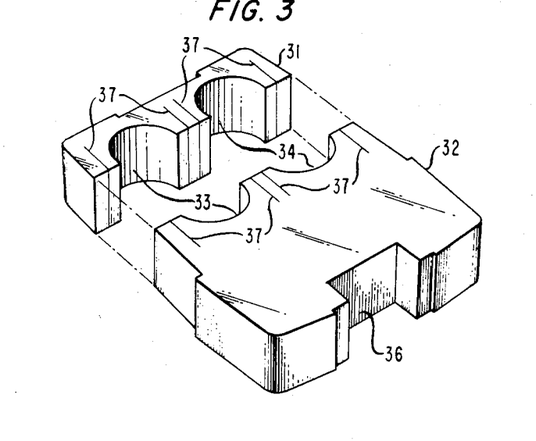
FIG. 3 is an exploded perspective view of a pre-cut, compliant foam moisture barrier having front and rear portions.

FIG. 3 illustrates a pre-cut, compliant foam moisture barrier or sealing gland comprising rear portion 31 and front portion 32 in an exploded perspective view. When portions 31 and 32 mate together, circular apertures 33 and 34 are formed to provide passage for the main cable, typically in the form of a cable loop for connection with the drop wire which runs into the service channel associated with the cut-out portion 36 of the moisture barrier. In the preferred embodiment, the foam material suitable for this application is a closed cell foam selected to prevent penetration of moisture or water. Other suitable material could as well be used for providing this function. Another feature of the pre-cut sealing gland is a series of spaced parallel cuts 37 in the region of apertures 33 and 34. These cuts 37 cut the moisture barrier into segmented portions thereof. The group of segments each is individually compressed to form a highly compressible section of foam mass devoid of spaces or gas normally characteristic of compressing a unitary foam block.

Figure 4:
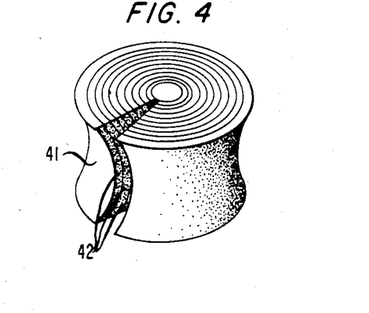
FIG. 4 is a view in perspective of a cylindrical shaped foam plug comprising multiple layers.

FIG. 4 illustrates a cylindrical shaped foam plug 41 comprising multiple layers 42. Removal of the appropriate number of inner layers 42 provides an opening to accommodate a range of cable sizes which are fed through apertures 33 and 34 of the sealing gland of FIG. 3. The multiple layered plug of FIG. 4 serves as a compliant collar for the section of cable passing through an aperture.

Figure 5:
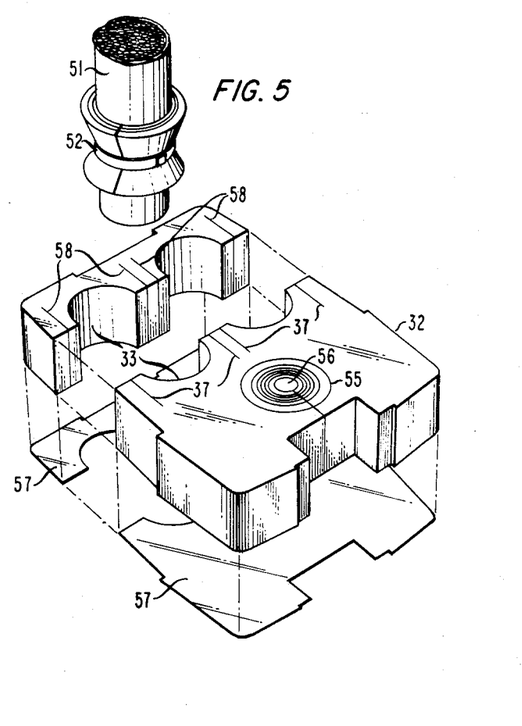
FIG. 5 is an exploded assembly view of a moisture barrier with a rodent shield wherein a plug of the type illustrated in FIG. 4 is secured around a cable by a tie.

FIG. 5 is an exploded assembly view of the moisture barrier wherein a plug of the type illustrated in FIG. 4 is secured around cable 51 by tie 52. This assembly then forms a flexible collar to be inserted into aperture 33. It should also be noted that portion 32 includes a third aperture 55 with a layered component 56 inserted therein. In the case of a third cable to be connected within the enclosure, the appropriate inner layers of component 56 may be removed to provide an opening to accommodate the cable. An additional two-piece component illustrated at the base of the moisture barrier of FIG. 5 is a rodent shield 57. Rodent shield 57 may be readily formed from either a non-corrosive sheet metal or a relatively hard plastic sheet material. It should also be noted that the moisture barrier of FIG. 5 includes a series of parallel cuts 37 to provide flexible segmentation capable of uneven deformation devoid of openings for the assembly of cable 51.

Figure 6:
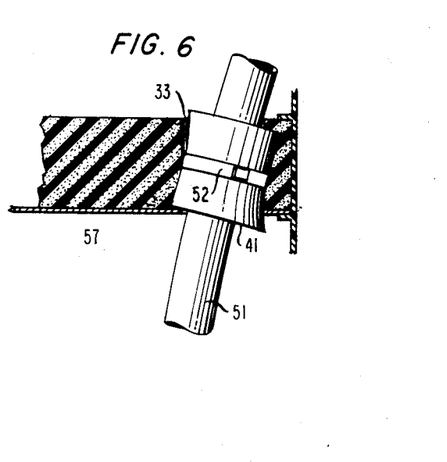
FIG. 6 is a sectional view of a moisture barrier through aperture 61 wherein the cable assembly passes through at an angle.

FIG. 6 is a sectional view of a moisture barrier through aperture 33 wherein the cable assembly passes through at an angle. The cable assembly includes cable 51 wrapped with multilayer collar 41 bound by tie 52. Even though cable 51 is presented to aperture 33 at an inclined angle, a good seal is presented devoid of openings serving to illustrate the non-critical characteristic of this sealing gland arrangement.

Figure 7:
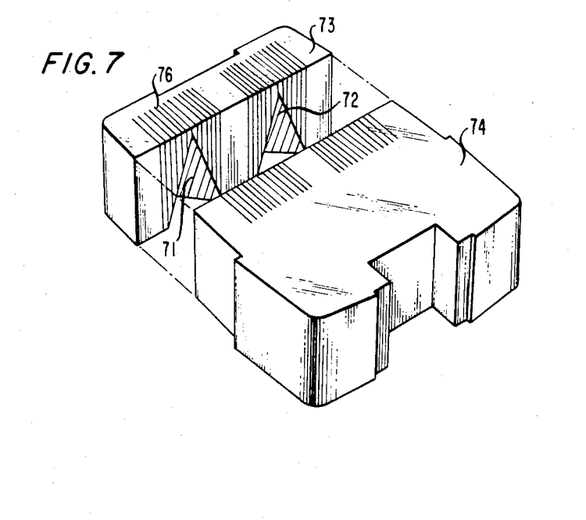
FIG. 7 is a perspective view of a moisture barrier wherein removed material forms voids at the junction of two sections of material.

FIG. 7 is an alternative moisture barrier wherein pentahedral sections of removed material form voids 71 and 72 equally extending into each of sections 73 and 74 as they join, thereby forming an alternative to apertures 33 and 34 in FIG. 3. The advantage of voids 71 and 72 is that plug 41 of FIG. 4 is not required, while the angularly inclined surfaces within voids 71 and 72 offer the flexibility of accommodating to a great range of sizes of cable. As is evident in FIG. 7 at the junction of sections 73 and 74, a series or cluster of parallel cuts or slits 76 having a rectangular envelope provide segmentation of the foam in the region of voids 71 and 72. The partial segmentation in FIG. 7 is provided by cuts 76 which are closer together than the comparable cuts in FIGS. 3 and 5.

Figure 8:
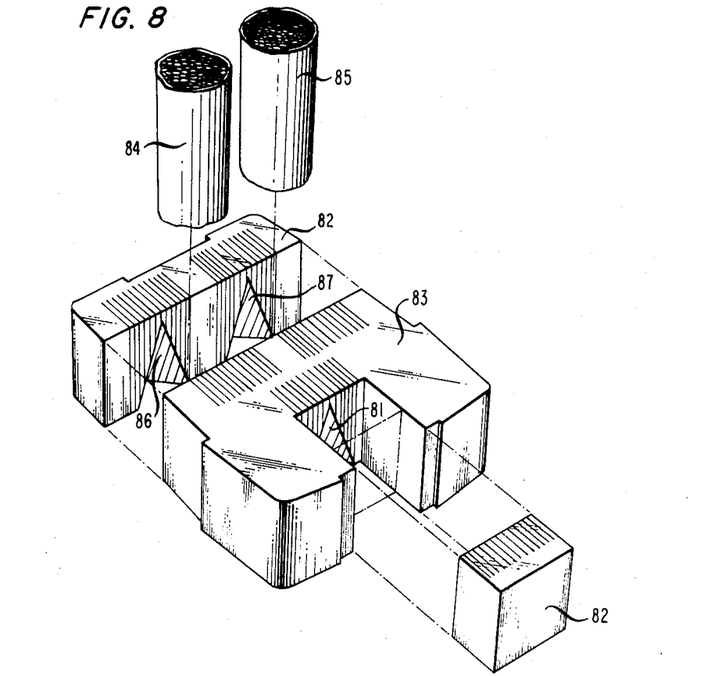
FIG. 8 is a perspective view of a moisture barrier wherein there are three sections and voids are formed at the junctions of the sections.

FIG. 8 illustrates another moisture barrier arrangement which extends the inventive principles of FIG. 7 to accommodate passage of a third cable section through void 81 formed by the mating of sections 82 and 83. Cable sections 84 and 85 would extend through the moisture barrier at voids 86 and 87 when the arrangement of FIG. 8 is assembled in the base of a typical pedestal enclosure, illustrated in FIGS. 1 or 2.

Figure 9:
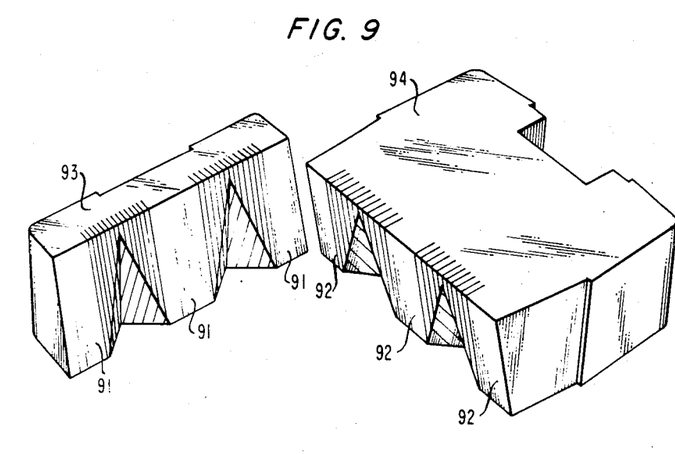
FIG. 9 is a perspective view of another moisture barrier wherein the surfaces at the junction of the two sections are inclined to provide an angular mating plane.

FIG. 9 is another moisture barrier similar to the one depicted in FIG. 7. However, the moisture barrier of FIG. 9 is different in that surfaces 91 and 92 are inclined or sloped to provide an angular mating plane when sections 93 and 94 are joined.

Figure 10:
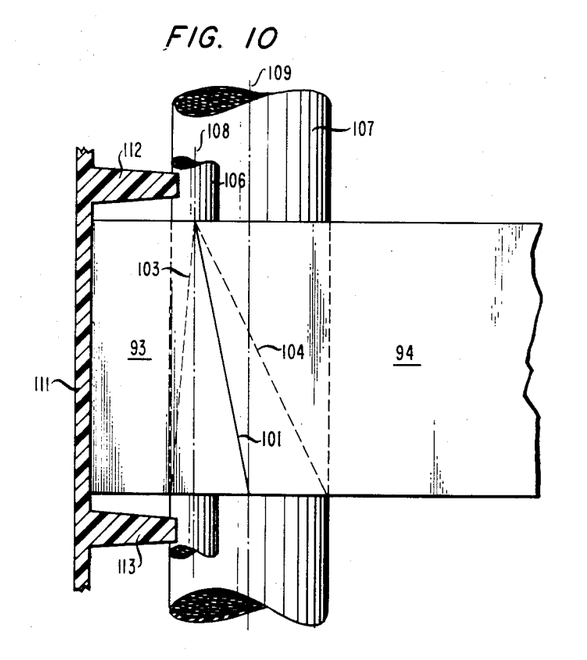
FIG. 10 is an assembly view of the moisture barrier of FIG. 9 in position with a cable illustrating the angular mating plane when the sections of the moisture barrier are joined.

FIG. 10 illustrates this mating plane or junction with line 101 when sections 93 and 94 are joined. The normal position of intersecting planes forming the voids is illustrated in phantom by lines 103 and 104. The term "normal position" is that which the foam assumes in the absence of a cable. The flexibility of this arrangement is illustrated by the difference in cable sizes depicted by cable sections 106 and 107 with respective center lines of 108 and 109. A sectional portion 111 of an enclosure is also shown in FIG. 10. Section 111 serves as a guide clamp for the cable by securing it to protrusions 112 and 113. Protrusions 112 and 113 with appropriate securing ties (not shown) ensure that the cable passes through the sealing gland in a perpendicular orientation. In addition to securing the cable, this arrangement enables good sealing action to occur by properly positioning the cable.

The webs of material will seal only at the diameter of the cable. The positions of protrusions 112 and 113 are fixed but the cable diameter is variable. The diagonal interface 101 therefore permits any size cable to seal on its center line because there is always some position within the thickness of the compliant material where the center line of the cable will pass through diagonal interface 101.

Figure 11:
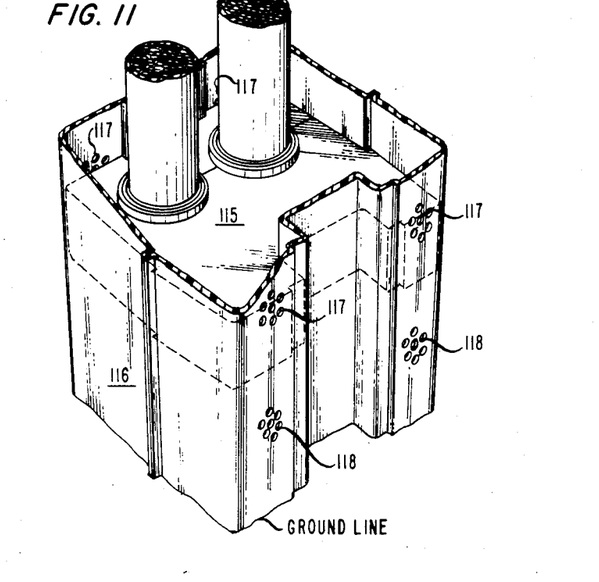
FIG. 11 is a broken view in perspective of a portion of an enclosure with a moisture barrier and and water drainage holes.

FIG. 11 shows an appropriate placement of sealing gland 115 inside enclosure section 116. Above and below sealing gland 115 are a plurality of salt-shaker-patterned holes 117 and 118. Holes 117 provide ventilation and also drainage for water in the upper portion of the enclosure partially illustrated in FIG. 11. Holes 118 principally provide ventilation for the lower portion of the enclosure which extends into the ground in a typical installation.

Figure 12:
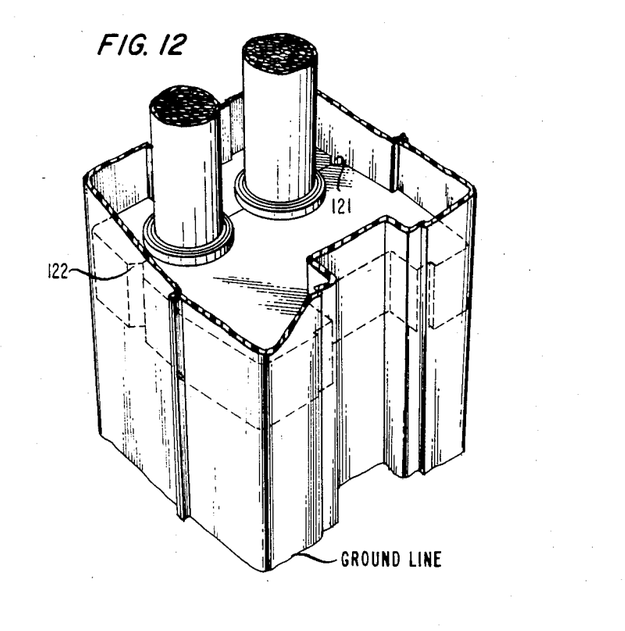
FIG. 12 is a broken view in perspective of a portion of an enclosure with a moisture barrier and V shaped passages for water drainage.

FIG. 12 illustrates an alternative version to that of FIG. 11 wherein V-shaped passages 121 and 122 provide the drainage function of holes 117. Although not shown in FIG. 12, ventilation holes such as holes 118 of FIG. 11 may be readily included to provide ventilation.

Figure 13:
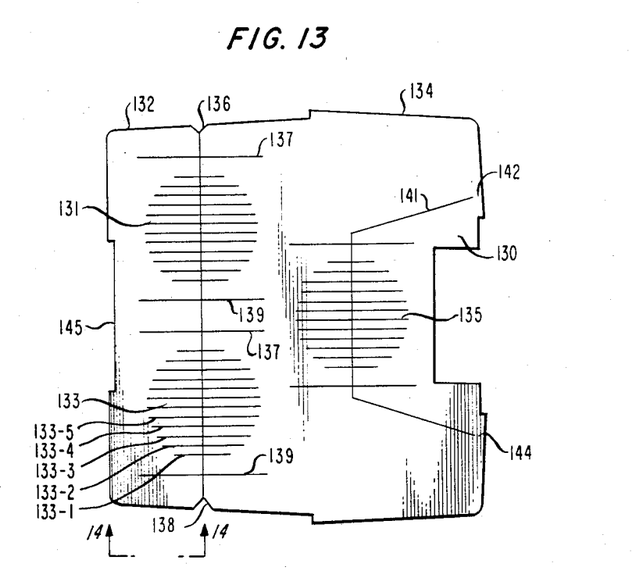
FIG. 13 is a top view of another moisture barrier with clusters of cuts across each junction of mating sections of material, each cluster having a circular envelope.
Figure 14:
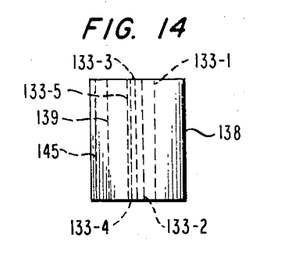
FIG. 14 is an elevational view taken on line 14—14 of FIG. 13 of one section of material showing the cuts of FIG. 13 extending through the entire thickness of the material.

Referring to FIG. 13, there is shown another moisture barrier comprising sections 132 and 134. Such a barrier is an alternative to that of FIG. 7 for use in a pedestal enclosure such as shown in FIGS. 1 or 2. The barrier comprises sections 132 and 134, analogous, respectively, to sections 73 and 74. Shown are a plurality of webs 131, 133 and 135 each formed by cutting the foam at close intervals through its entire thickness. FIG. 14 shows an elevational view taken on line 14-14 of section 132. As indicated in FIG. 14, slits 133-1 through 133-5 and slit 139 are cut through the entire thickness of section 132. FIGS. 13 and 14 show the webs as having a circular envelope. On both sides of each cluster of webs, there are two slightly longer cuts 137 and 139. The diameter of each circular envelope is about one half inch bigger than the maximum diameter of the cable to be sealed. That is, the cluster of webs should be larger than the cable.

Slitting the aforesaid compliant material provides two important functions. First, when a cable is clamped between the two sections, only those webs which clamp the cable will experience a compressive force conforming to the shape of the cable. The remaining region of the compliant material will be undisturbed and will seal the interface between the two sections. Second, the two cuts on both sides of the cluster of webs isolate the clamping region from the remaining region of the compliant material. This ensures that the two sections will meet to seal the interface.

The two sections 132 and 134 are inserted into the space within the pedestal between the cables and the inner wall of the pedestal in such a way that a cluster of webs clasps a cable. The moisture barrier sections 132 and 134 are fabricated from a synthetic material such as foam so that each cluster of webs yields to house a cable.

There are two grooves 136 and 138 at the junction of the two moisture barrier sections 132 and 134 and extending the entire thickness thereof. These grooves, analogous to grooves 121 and 122, respectively, of FIG. 12, function to permit drainage of condensation within a pedestal enclosure above the moisture barrier sections 132 and 134. Also, a recess 145 is provided in section 132 for receiving a portion of the pedestal enclosure having a complementary shape.

Moisture barrier section 134 has a cut along line 141 in the shape of a channel and passing through the cluster of webs 135 to form a section 130 secured at areas 142 and 144. If a need arises for the introduction of an additional cable into a pedestal enclosure, moisture barrier section 130 may be removed forcibly from section 134, the two areas 142 and 144 yielding.

Figure 18:
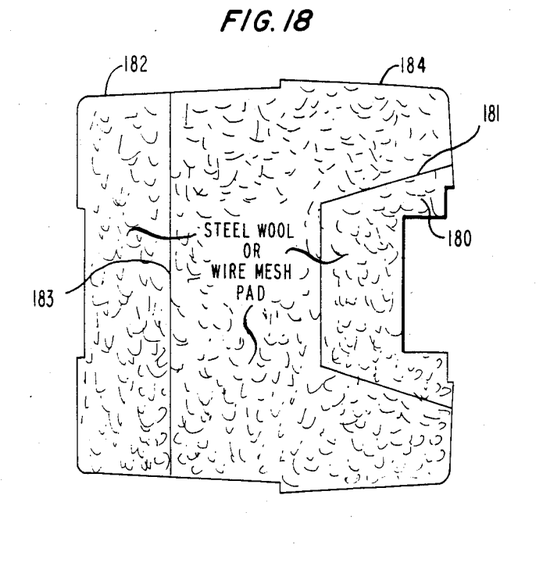
FIG. 18 is a top view of a moisture barrier of steel wool.

Referring to FIG. 18, there is shown a steel wool or wire mesh pad comprising three sections 180, 182 and 184. Sections 182 and 184 meet along the junction line 183. Sections 180 and 184 meet along the junction line 181 which defines a channel. This wire mesh has the same outer contour as the compliant material of FIG. 13 except that the drainage channels 136 and 138 are not provided with the embodiment using steel wool. The steel wool is sufficiently porous that water will drain through the steel wool. Further, the webs 131, 133, 135 and strain relief cuts 137 and 139 of FIG. 13 are not necessary for the steel wool of FIG. 18.

Figure 19:
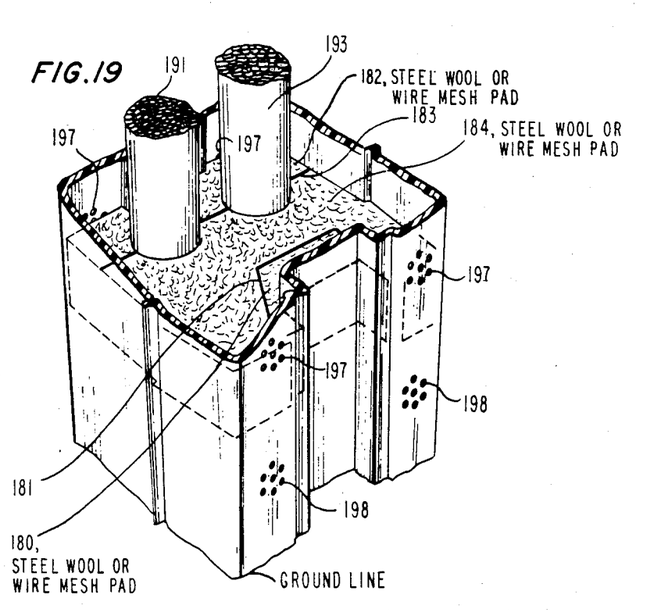
FIG. 19 is a perspective view of a section of a cable enclosure with cables therein and a steel wool moisture barrier in position.

Referring to FIG. 19, there is shown a section of a cable pedestal 190 analogous to that of FIG. 11. The steel wool sections 180, 182 and 184 are shown inserted in place within the interior of pedestal 190. Sections 182 and 184 are shown surrounding cables 191 and 193. Drainage holes 197, analogous to drainage holes 117 of FIG. 11, permit water to drain therethrough. Likewise, drainage holes 198, analogous to drainage holes 118 of FIG. 11, permit moisture to escape therethrough. The thickness of the steel wool or wire mesh pad depends on the interior section of pedestal 190. It is made sufficiently thick that moisture is prevented from entering the upper section of pedestal 190 but sufficiently porous that water within the upper section of pedestal 190 will drain therethrough.

In one embodiment, one or more small layers of steel wool may be combined with one or more layers of the compliant, synthetic material. The advantage of using steel wool is its resistance to chewing by rodents.

Figure 15:
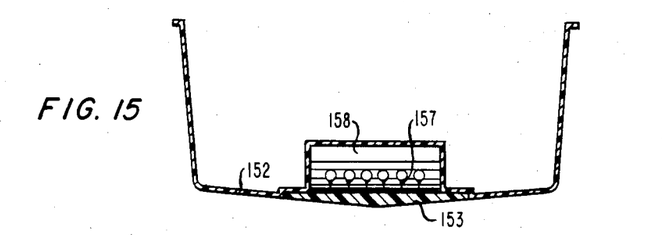
FIG. 15 is a top view of a portion of the enclosure of FIG. 1 or FIG. 2 with a channel therein, a cover in position, drop wires in the channel and a moisture barrier between drop wires, the channel and cover.
Figure 16:
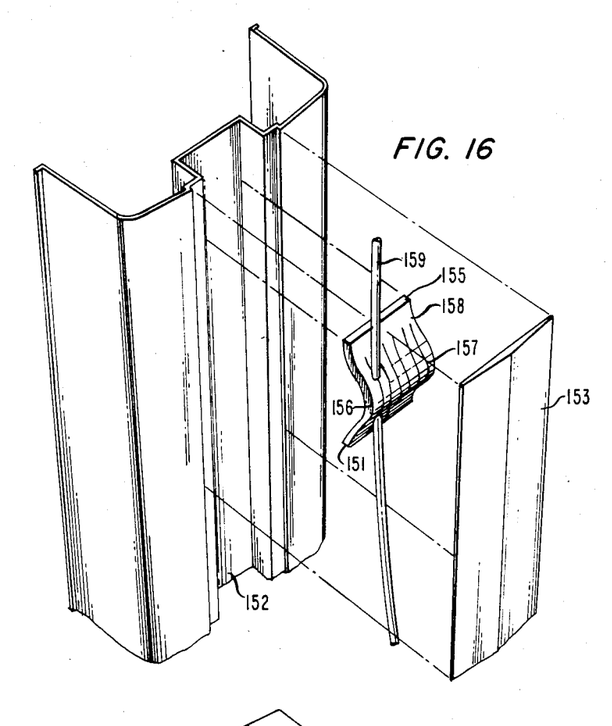
FIG. 16 is an exploded view in perspective showing the assembly of the moisture barrier, the channel and the cover of FIG. 15.

Referring to FIGS. 15 and 16, there is shown a service channel 152 and cover 153 such as channel 12 and cover 13 of FIG. 1 or channel 22 and cover 23 of FIG. 2, respectively. A moisture barrier made from synthetic material such as compliant foam has a plurality of cuts 157 through the entire thickness thereof for receiving a cable comprising drop wires 159 into each cut. Furthermore, the moisture barrier 158 is preformed to curve out at 156, a point about half way between the two ends 151 and 155.

Figure 17:
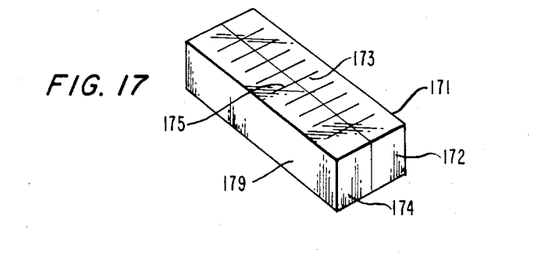
FIG. 17 is a perspective view of another type of moisture barrier that may be inserted between the channel and the cover shown in FIG. 15.

Another embodiment of a moisture barrier is shown in FIG. 17. Two sections 172 and 174 each comprising, respectively, a plurality of cuts 173 and 175 passing the entire thickness therethrough are used to fill the space between the cables and the service channel. End 171 of section 172 may be fastened to the surface of a service channel such as channel 152 of FIG. 16 and end 179 may be fastened to a cover such as cover 153 also of FIG. 16. In yet another embodiment (not shown), a single block of compliant material may be used. A plurality of pieces of material are removed to leave a plurality of holes into which the drop cables are introduced. For ease in working, the block of material may be cut into two.

What is claimed is:

1. In an enclosure housing at least one cable, a device for preventing contaminants from entering said enclosure comprising:
   a body filling a predetermined section of the interior of said enclosure surrounding said at least one cable; said body comprising:
   at least first and second blocks of compliant, synthetic material of at least a predetermined thickness, each of said first and second blocks having an upper surface, a lower surface and a side mating with a side of the other of said first and second blocks,
   each of said first and second blocks having one or more clusters of closely spaced cuts traversing the thickness of its mating side and extending into the block from said mating side to produce a plurality of webs or fingers,
   the webs or fingers produced by the clusters of closely spaced cuts traversing the thickness of said mating sides being compressed against said at least one cable, and the blocks extending between the at least one cable and the inner surfaces of the enclosure.

2. In an enclosure housing at least one cable, a device for preventing contaminants from entering said enclosure according to claim 1 wherein each of the one or more clusters of cuts of each block has an envelope of prescribed shape, the one or more cluster envelopes of said first block being aligned with the one or more cluster envelopes of said second block.

3. In an enclosure housing at least one cable, a device for preventing contaminants from entering said enclosure according to claim 2 wherein the prescribed envelope of each cluster of cuts is a circular envelope.

4. In an enclosure housing at least one cable, a device for preventing contaminants from entering said enclosure according to claim 2 wherein the prescribed envelope of each cluster of cuts is a rectangular envelope.

5. In an enclosure housing at least one cable, a device for preventing contaminants from entering said enclosure according to claim 2 wherein each cluster of closely spaced cuts in each block has a recess resulting from removing material from the lower surface of each block partially through the thickness of the block within the envelope of the cluster at its mating side.

6. In an enclosure housing at least one cable, a device for preventing contaminants from entering said enclosure according to claim 5 wherein the recesses within the cluster envelopes of the first and second blocks when in mating relationship from a pyramidal recess opening on the lower surfaces of the mating blocks.

7. In an enclosure housing at least one cable, a device for preventing contaminants from entering said enclosure according to claim 1 wherein the device separates the enclosure into an upper portion and a lower portion and the device further comprises a plate fabricated from a substantially rigid material in contact with the lower surfaces of said blocks and coextensive with the block portions outside said clusters for preventing ingress of animals into the upper portion of said enclosure.

8. In an enclosure housing at least one cable, a device for preventing contaminants from entering said enclosure according to claim 1 wherein at least one layer of steel wool is associated with said blocks of complaint, synthetic material to prevent ingress of animals into said enclosure.

* * * * *